Patented June 11, 1935

2,004,891

UNITED STATES PATENT OFFICE 2,004,891

ANÆSTHETIC COMPOSITION

Samuel D. Goldberg, Brooklyn, N. Y., assignor to Novocol Chemical Mfg. Co. Inc., Brooklyn, N. Y., a corporation of New York No Drawing. Application December 8, 1931, Serial No. 579,828

7 Claims. (Cl. 167—52)

This invention relates to anæsthetics and particularly local anæsthetics for hypodermic injection.

In my copending application Ser. No. 500,671 filed December 8, 1930, I have described anæsthetic compositions having advantages over and representing improvements upon the previously known compositions for similar use. These compositions comprised an acid anæsthetic material such as procaine hydrochloride, a vaso-constricting substance such as epinephrin and buffer and preservative material. This composition has a predetermined pH value ranging upward preferably from about 5.7, this being the critical pH value for blood. Such compositions as described in the said application have given highly satisfactory results, eliminating objections to the previously known similar anæsthetics, and producing ordinarily rapid anæsthesia with little or no necrosis swelling or after pain. The recovery of the patient after the use of the anæsthetic there described accordingly has been practically uneventful.

The principal object of the present invention is to provide an anæsthetic and solutions containing the same which shall possess advantages over the well-known procaine hydrochloride solution, particularly in that they give rapid anæsthesia and substantially lessen or eliminate necrosis and swelling with the pain consequent thereto.

The invention comprises the novel compositions and component mixtures comprised in such compositions, specific embodiments of which are described hereinafter by way of example only and in accordance with what I now consider the preferred manner of practicing the invention.

In accordance with my invention I find that another salt of procaine may be employed instead of hydrochloride. It is not possible, however, according to my research to pick out any given acid and combine it with the procaine base and secure the desired results. For example, it is important that in forming the salt, an acid product should be obtained otherwise decomposition of epinephrin proceeds rapidly. For example if boric acid is used in combination with procaine, a somewhat alkaline salt results which in the usual aqueous solution produces such decomposition. On the other hand I have found that with certain acids and combinations, ionization is too great and therefore the resulting solution tends to have a low pH value, and are too acid. With another composition I found that the resulting salt is toxic and hence undesirable for use as an anæsthetic. After considerable research, I have found a new salt which so far as I know has not heretofore been described or known and I have found it satisfactory for the purposes of my invention. This salt is an acetate, the formula of which is given as follows:—

$NH_2C_6H_4COOC_2H_4N(C_2H_5)_2.CH_3COOH$ (Acetate of diethyl amino ethyl ester of para amino benzoic acid).

The following is the new preferred method of preparation of this new salt:—

For preparing procaine acetate

To 232 grams procaine base, warmed to a temperature of 75° is added 60 grams of glacial acetic acid in 60 grams of warm water, (approximately 50° C.) and the resulting mass stirred and then allowed to stand until cool when the procaine acetate is precipitated into large crystals. The mass is then centrifuged and the crystals are dissolved in 95% alcohol and recrystalized. The pure white crystals have a melting point of 55°–56° C. The quantity of the water and the temperature may be varied as can the other solvents used for recrystalization purposes.

The procaine acetate above in 2% concentration has a pH value of 6.9. It will retain its pH value in solution substantially constant over an extremely long period. This material can be made up into tablet form for hypodermic injection. It is not absolutely necessary to buffer it with alkaline salts and it is compatible with epinephrin. It is soluble in water in all proportions also in alcohol and the usual solvents. It is also soluble in oils. It can be sterilized and used similarly to procaine hydrochloride for anæsthesia.

For preparing a buffered solution employing the acetate, I use the following preferred formula which has been successfully used for local anæsthesia:—22 grams of procaine acetate (Formula A), .022 molar gram di-sodium phosphate, 0.1 molar gram sodium chloride, 0.025 molar gram sodium bisulfite, 2 cc. of N/1000 phosphoric acid and 0.052 gram of epinephrin were combined with sufficient water to make one liter.

It will be noted in this formula certain ingredients other than procaine acetate are used, viz. disodium phosphate, sodium chloride, sodium bisulphite and phosphoric acid and epinephrin. The disodium phosphate and sodium chloride increase the specific gravity of the solution and the disodium phosphate in addtion acts as a buffer material so that in case there is any tendency for the solution to change through oxidation and the production of acid this buffer material, disodium phosphate, will act to resist such change in the usual manner. The sodium bisulphite acts as an anti-oxidant to oppose oxidation of the ingredients of the solution, particularly epinephrin. Phosphoric acid is employed to regulate the acidity. Epinephrin has the usual function of a vaso-constrictor.

The solution so made up has a specific gravity of approximately 1.0110 and a pH value of 6.8 approximately. At about this pH value, namely approximately that of blood, anæsthesia is produced with great rapidity. I prefer to employ the specific gravity mentioned, 1.0110. In using this solution the benefits described in connection with the solutions prepared according to the disclosure in my copending application Ser. No. 500,671, are found. In addition I have observed that over a long period of time the pH value of the solution does not appreciably change.

The buffer salts mentioned in my copending application, Ser. No. 500,671, now Patent #1,924,685, may also be employed with procaine acetate instead of the buffer salt mentioned in my preferred formula given above.

While I have described my improvements in great detail and with respect to preferred forms thereof, I do not desire to be limited to such details and forms since many changes and modifications may be made and the invention embodied in widely different forms without departing from the spirit and scope thereof in its broader aspects. Hence I desire to cover all modifications, forms and embodiments coming within the language or scope of any one or more of the appended claims.

What I claim as new and desire to secure by Letters Patent, is:—

1. A buffered anæsthetic solution containing an alkaline buffer, procaine acetate and epinephrin, and having a pH value of about 5.7 to about neutral.

2. An anæsthetic solution containing a solvent, procaine acetate, epinephrin and an anti-oxidation agent for the epinephrin and buffers, said solution having a substantially constant pH value on storage of about 5.7 to about neutral.

3. A base composition for anæsthetic solution containing procaine acetate, a vaso-constricting material, an anti-oxidant and an alkaline buffer material for buffering the procaine acetate so that when the composition is dissolved in water it has a pH value of about 5.7 to about neutral.

4. As a new product of manufacture the acetate of diethyl amino ethyl ester of para amino benzioc acid, having the formula $$NH_2C_6H_4COOC_2H_4N(C_2H_5)_2 \cdot CH_3COOH.$$

5. An aqueous anæsthetic solution containing procaine acetate, di-sodium phosphate, a bisulfite, epinephrin and an added acid, having a pH value of about 5.7 to about neutral.

6. An aqueous anæsthetic solution containing epinephrin and the acetate of diethyl amino ethyl ester of para amino benzioc acid which is a white crystalline solid, melting at 55°–56° C.

7. An anæsthetic solution containing an alkaline salt serving as a buffer material, procaine acetate and a vaso-constricting material, and having a pH value of about 5.7 to about neutral.

SAMUEL D. GOLDBERG.